a2

US008315939B2

(12) United States Patent
Blank

(10) Patent No.: US 8,315,939 B2
(45) Date of Patent: Nov. 20, 2012

(54) SYSTEM AND METHOD FOR COMPUTER IMPLEMENTED COLLATERAL MANAGEMENT

(75) Inventor: Brian Blank, Manalapan, NJ (US)

(73) Assignee: The Bank of New York Mellon, New York, NY (US)

(*) Notice: Subject to any disclaimer, the term of this patent is extended or adjusted under 35 U.S.C. 154(b) by 0 days.

(21) Appl. No.: 13/368,952

(22) Filed: Feb. 8, 2012

(65) Prior Publication Data
US 2012/0136808 A1 May 31, 2012

Related U.S. Application Data

(63) Continuation of application No. 12/832,428, filed on Jul. 8, 2010, now Pat. No. 8,145,552.

(51) Int. Cl.
G06Q 40/00 (2006.01)
(52) U.S. Cl. .......... 705/36 R; 705/30
(58) Field of Classification Search .......... 705/10–44
See application file for complete search history.

(56) References Cited

U.S. PATENT DOCUMENTS

| | | | |
|---|---|---|---|
| 5,802,499 A * | 9/1998 | Sampson et al. | 705/35 |
| 6,018,721 A * | 1/2000 | Aziz et al. | 705/36 R |
| 7,734,538 B2 * | 6/2010 | Bauerschmidt et al. | 705/38 |
| 7,797,230 B1 * | 9/2010 | Barie et al. | 705/38 |
| 7,818,237 B1 * | 10/2010 | Efron et al. | 705/36 R |
| 7,917,427 B2 * | 3/2011 | Fitzpatrick et al. | 705/37 |
| 2001/0037284 A1 | 11/2001 | Finkelstein et al. | |
| 2003/0023539 A1 | 1/2003 | Wilce et al. | |
| 2008/0215480 A1 | 9/2008 | Mordecai | |
| 2008/0301062 A1 | 12/2008 | Glinberg et al. | |
| 2009/0192946 A1 * | 7/2009 | Buckmaster | 705/36 R |
| 2009/0234776 A1 | 9/2009 | Bauerschmidt et al. | |
| 2010/0228665 A1 * | 9/2010 | Mathieson et al. | 705/38 |
| 2011/0178956 A1 * | 7/2011 | Glinberg et al. | 705/36 R |
| 2012/0047062 A1 * | 2/2012 | Robinson | 705/37 |

OTHER PUBLICATIONS

International Search Report and Written Opinion as issued for International Patent Application No. PCT/US2011/043235, dated Oct. 20, 2011.

* cited by examiner

Primary Examiner — Frantzy Poinvil
(74) Attorney, Agent, or Firm — Pillsbury Winthrop Shaw Pittman LLP

(57) ABSTRACT

A data processing system manages collateral risk associated with a trade of a financial instrument includes a processor and a memory that contains a database configured to store a ruleset relating to determining eligibility of collateral to be considered for a desired trade. A search module searches for accounts that could potentially accept a security position based upon established search criteria. Search results are stored in the memory, and are used to identify one or more security positions eligible for use as collateral for the trade. A collateral analysis module determines a collateral preference ranking by at least applying the ruleset via an algorithm executed by the processor so as to confirm an eligibility of security positions eligible for use as collateral for the trade by testing in accordance with the ruleset. The processor outputs a relative collateral preference indication via a user interface.

17 Claims, 6 Drawing Sheets

FIG. 2

FIG. 3

SYSTEM AND METHOD FOR COMPUTER IMPLEMENTED COLLATERAL MANAGEMENT

CROSS-REFERENCE TO RELATED APPLICATIONS

Figure 1:
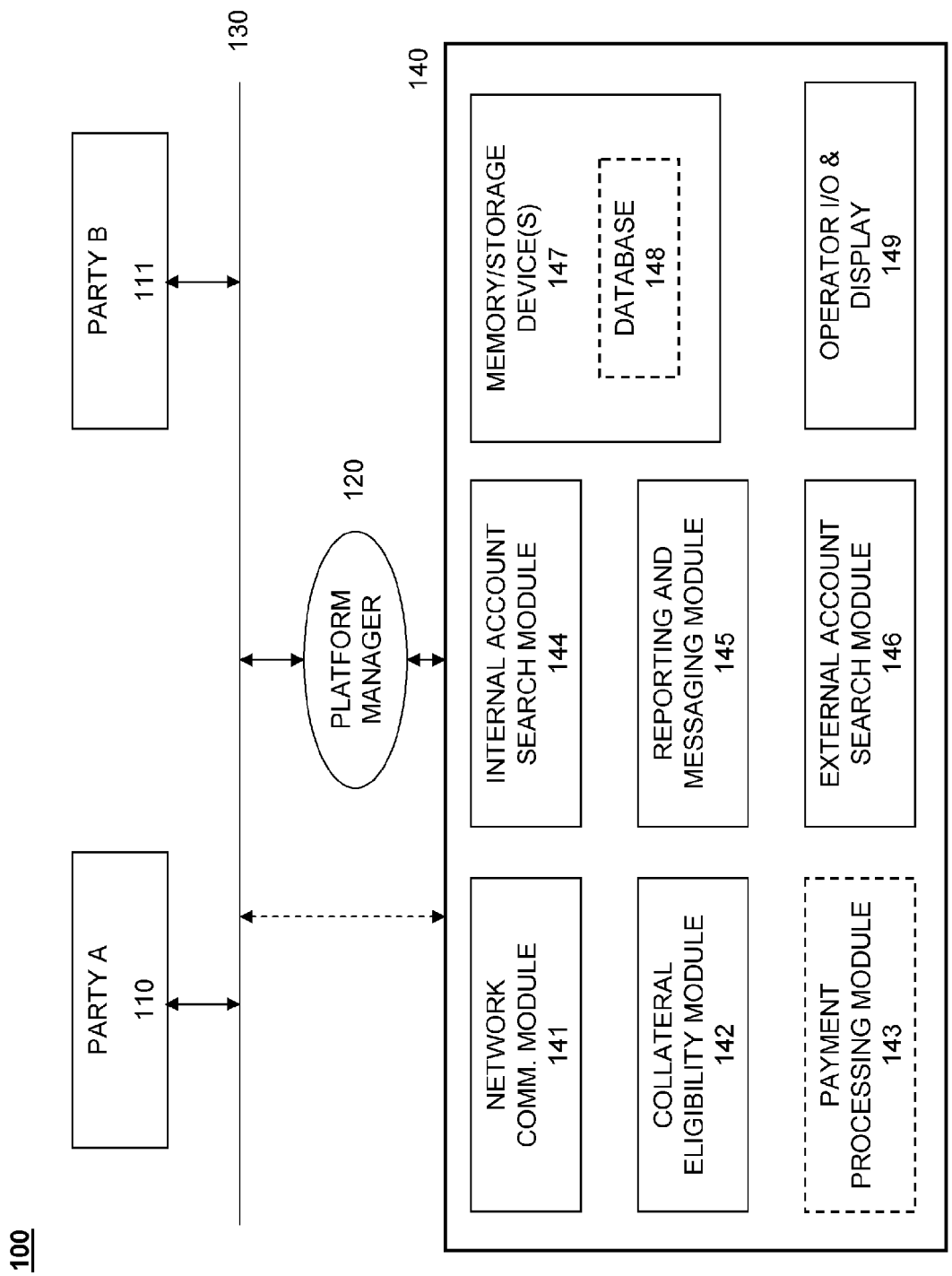

This application is a continuation under 35 USC §120 of co-pending U.S. patent application Ser. No. 12/832,428, filed Jul. 8, 2010, the entire contents of which are incorporated herein by reference.

BACKGROUND

This application is directed to a computer-implemented system and method useful for managing collateral associated with the trade of financial instruments. In particular, this application is directed to a computerized system and method for assessing the eligibility of a particular financial security for use as collateral in a financial transaction, e.g., tri-party financing, stock lending transactions, or other financial transactions.

In global capital markets, timely and complete information is critical, especially when collateral is at stake. With increased risk aversion and increasingly complex credit requirements prevalent in the financial markets, finding the right collateral for a collateralized transaction can be a challenging task, particularly in providing trading parties the ability to derive maximum value from their collateral holdings in a secure and controlled manner. The ability to assess what securities can be used as collateral, and with whom, is vital to the efficiency of using collateral.

What is needed is a system and method for managing collateral in a financial transaction. What is further needed is a computer-implemented system and method that simplifies the identification of securities contemplated as collateral for a financial transaction, expedites securities transfers between receivers and providers of collateral in financial transactions, and which reduces the risk to both parties associated with over and/or under collateralization.

SUMMARY

Through various embodiments described herein, the system and method of this disclosure reduces the risk and complexity associated with collateralized financial transactions. For example, various embodiments provide functions related to determining the "position eligibility" of financial instruments in terms of their potential desirability as collateral for a particular trade. Various aspects provide the ability to search and analyze accounts based upon different criteria, and may include securities that are or are not held in custody by the operator of the system. Results of the collateral eligibility search may be downloaded into spreadsheet form for further analysis, or shared electronically over a network.

Various embodiments of this disclosure may be used in conjunction with existing financial services platforms, for example the Bank of New York Mellon's tri-party repurchase agreement products (RepoEdge®) which allow clients to outsource the operational aspects of their collateralized transactions, and Derivatives Margin Management (DM Edge®), which helps clients manage credit risks associated with derivatives transactions by enabling them to accept, monitor and re-transfer collateral. These services, among others such as Repo Margin Management (RM Edge®), MarginDirect$^{SM}$, and Derivatives Collateral Net (DCN), may be delivered to clients through AccessEdge$^{SM}$, a real-time, web-based portal.

The operator/manager of the system and method of this disclosure acts as a third-party service provider to the two principals to a trade, and the various functions performed by the system and method provide value-added services which mitigate risk and lead to greater efficiencies for both parties.

In one or more embodiments, the position eligibility feature described herein provides fast and intuitive results, and allows users to screen securities on-line without the assistance of the system operator and without having to separately provide securities for eligibility screening, and to assess whether a particular security can be used as collateral and financing or stock lending transactions with existing customer bases.

In one or more embodiments, a data processing system for managing collateral risk associated with a trade of a financial instrument includes a processor; a memory coupled to the processor and containing a database therein configured to store a ruleset relating to determining eligibility of collateral to be considered for a desired trade; a search module configured to search for accounts that could potentially accept a security position therein based upon established search criteria and to store search results obtained therefrom in said memory, said search module using the search results to identify one or more security positions eligible for use as collateral for the trade; and a collateral analysis module that determines a collateral preference ranking of the one or more security positions eligible for use as collateral for the trade by at least applying said ruleset via an algorithm executed by said processor so as to confirm an eligibility of said one or more security positions eligible for use as collateral for the trade by testing in accordance with the ruleset, wherein the processor outputs a relative collateral preference indication via a user interface.

In another embodiment, a computer-implemented method for managing collateral risk associated with a trade of a financial instrument includes providing a data processing system comprising a memory coupled to a processor and containing a database therein configured to at least store one or more user-definable rulesets relating to a desired trade; searching for accounts that could accept potentially eligible security positions therein based upon user-selectable search criteria and storing search results obtained therefrom in said memory and using the search results to identify each of the potentially eligible security positions for consideration as collateral for the trade; and determining an eligibility of the potentially eligible security positions as collateral for the trade by applying said one or more user-definable rulesets in an algorithm executed by the processor by testing an eligibility of said each of the potentially eligible security positions as collateral for the trade, said testing an eligibility comprising testing an eligibility along each of a plurality of logical paths defined by the one or more user-definable rulesets; and causing the processor to output a relative collateral preference indication via a user interface.

In another embodiment, an article of manufacture comprising a tangible computer-readable medium that contains computer-executable code thereon which, when executed by a processor, causes the processor to carry out functions that manage collateral risk associated with a trade of a financial instrument, wherein the executed code is operable to: store at least one or more user-definable rulesets relating to a desired trade in a memory; search for accounts that could accept potentially eligible security positions therein based upon user-selectable search criteria and store search results obtained therefrom in said memory, said at least one search module using the search results to identify each of the potentially eligible security positions for consideration as collateral for the trade; and determining an eligibility of the potentially eligible security positions as collateral for the trade by applying said one or more user-definable rulesets in an algorithm executed by the processor by testing an eligibility of said each of the potentially eligible security positions as collateral for the trade, said testing an eligibility comprising testing an eligibility along each of a plurality of logical paths defined by the one or more user-definable rulesets; and causing the processor to output a relative collateral preference indication via a user interface.

The system and method of this disclosure provides various capabilities as discussed more fully in the detailed description below.

BRIEF DISCUSSION OF THE DRAWINGS

Figure 4A:
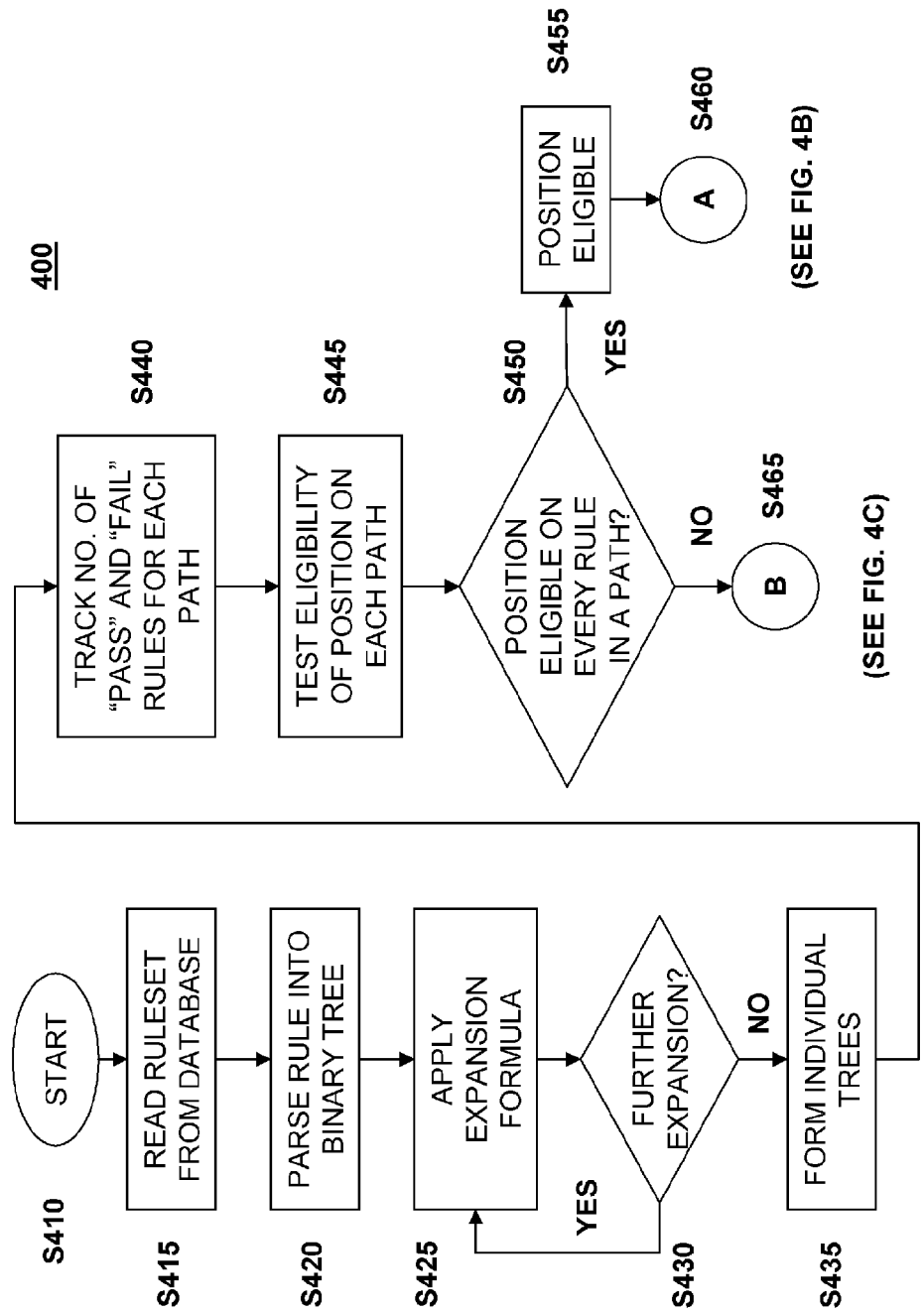
Figure 4B:
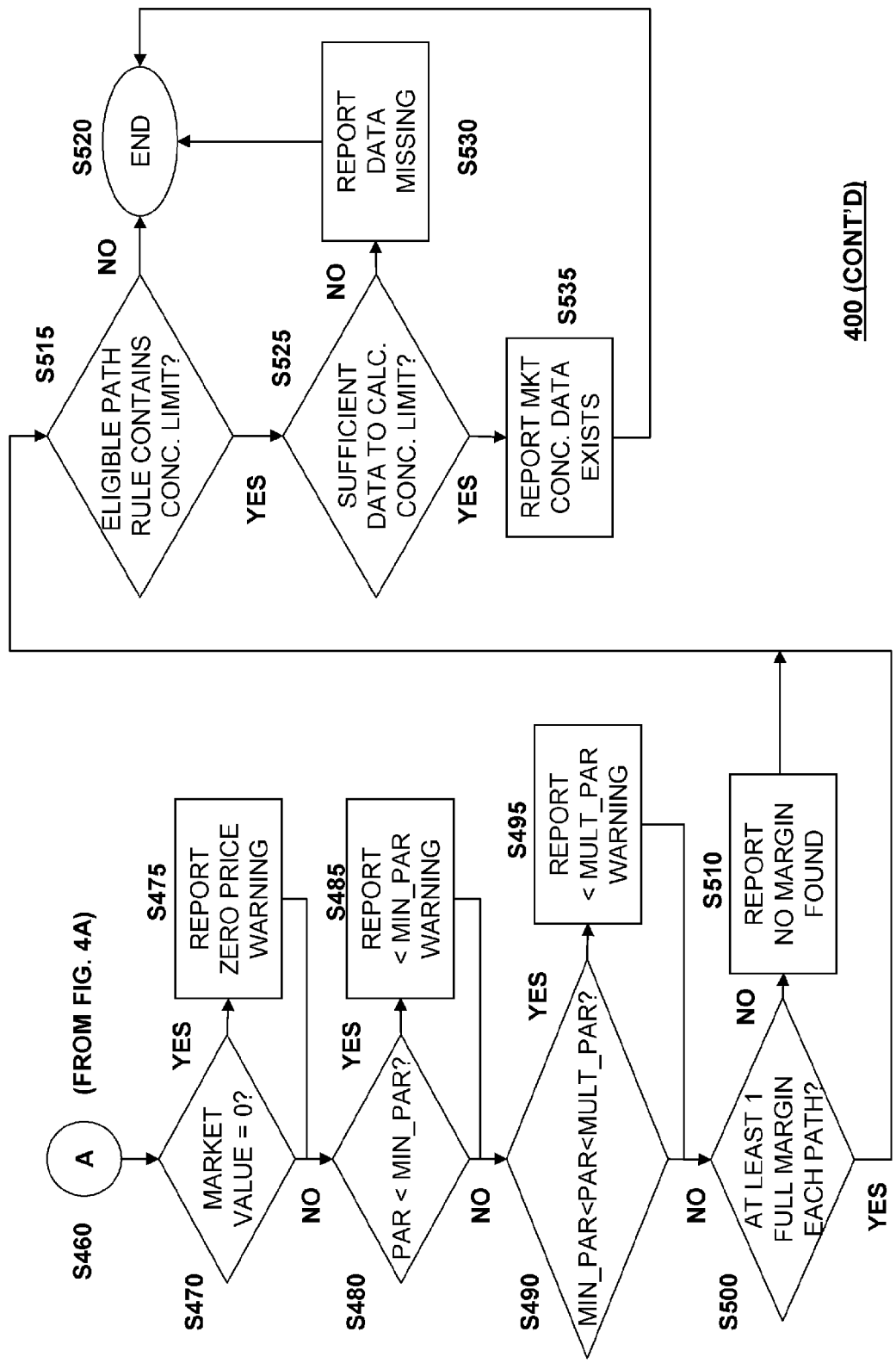
Figure 4C:
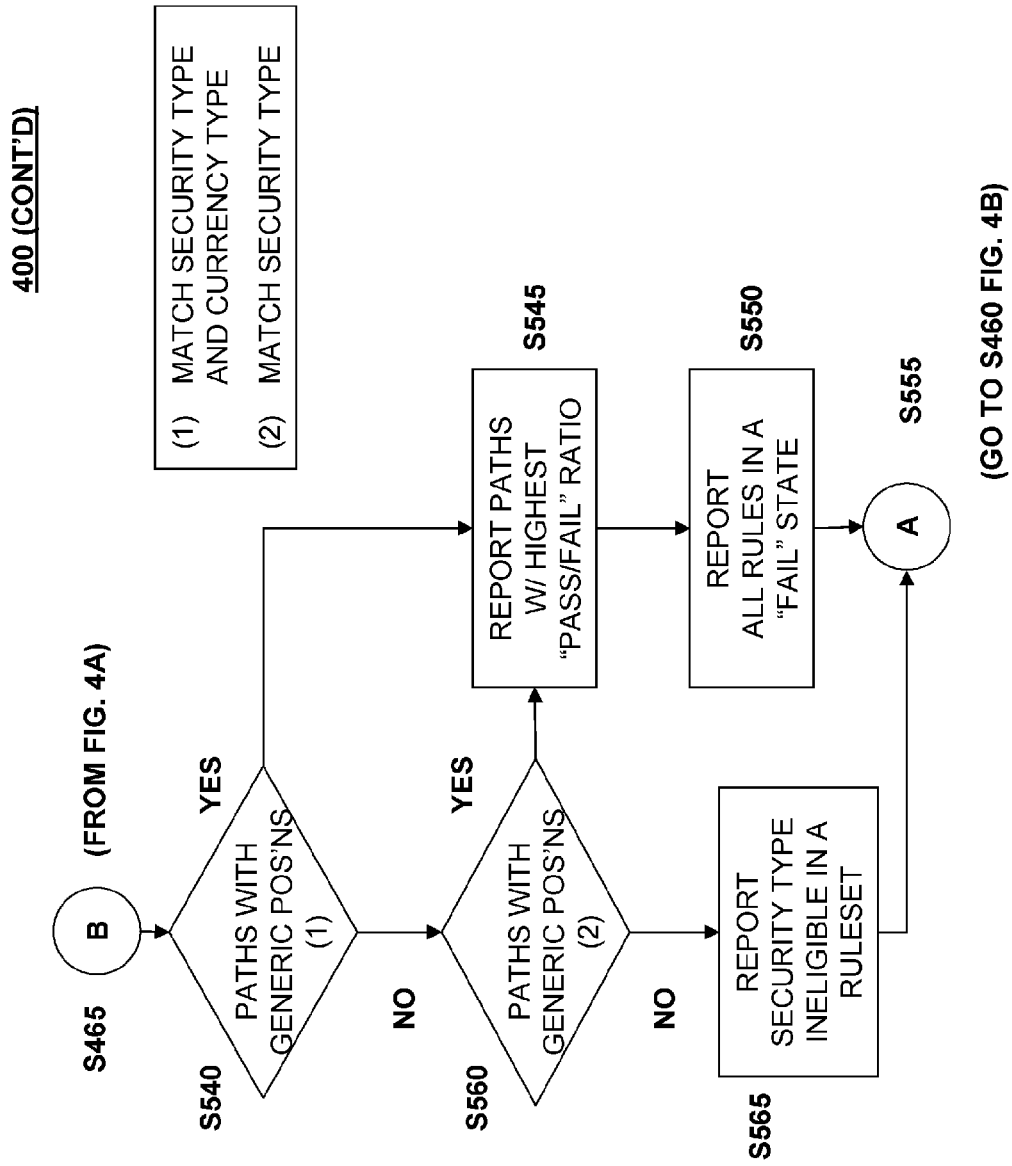

FIG. 1 provides a functional block diagram of an embodiment of a computer-implemented and networked system for collateral management;

Figure 2:
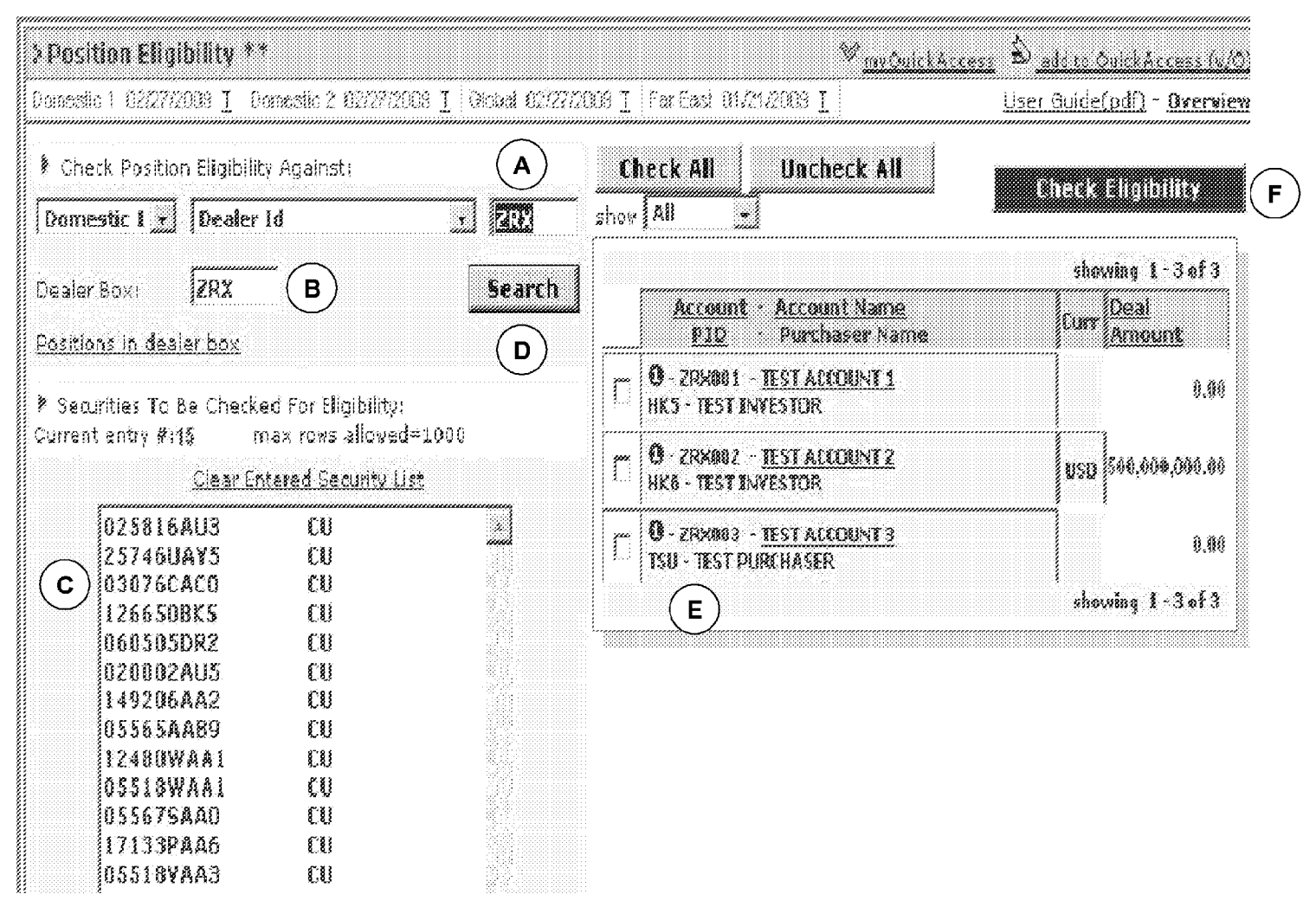

FIG. 2 provides an illustrative screen shot representing a Position Eligibility Screen that may be used in a graphical user interface of an embodiment of this disclosure;

Figure 3:
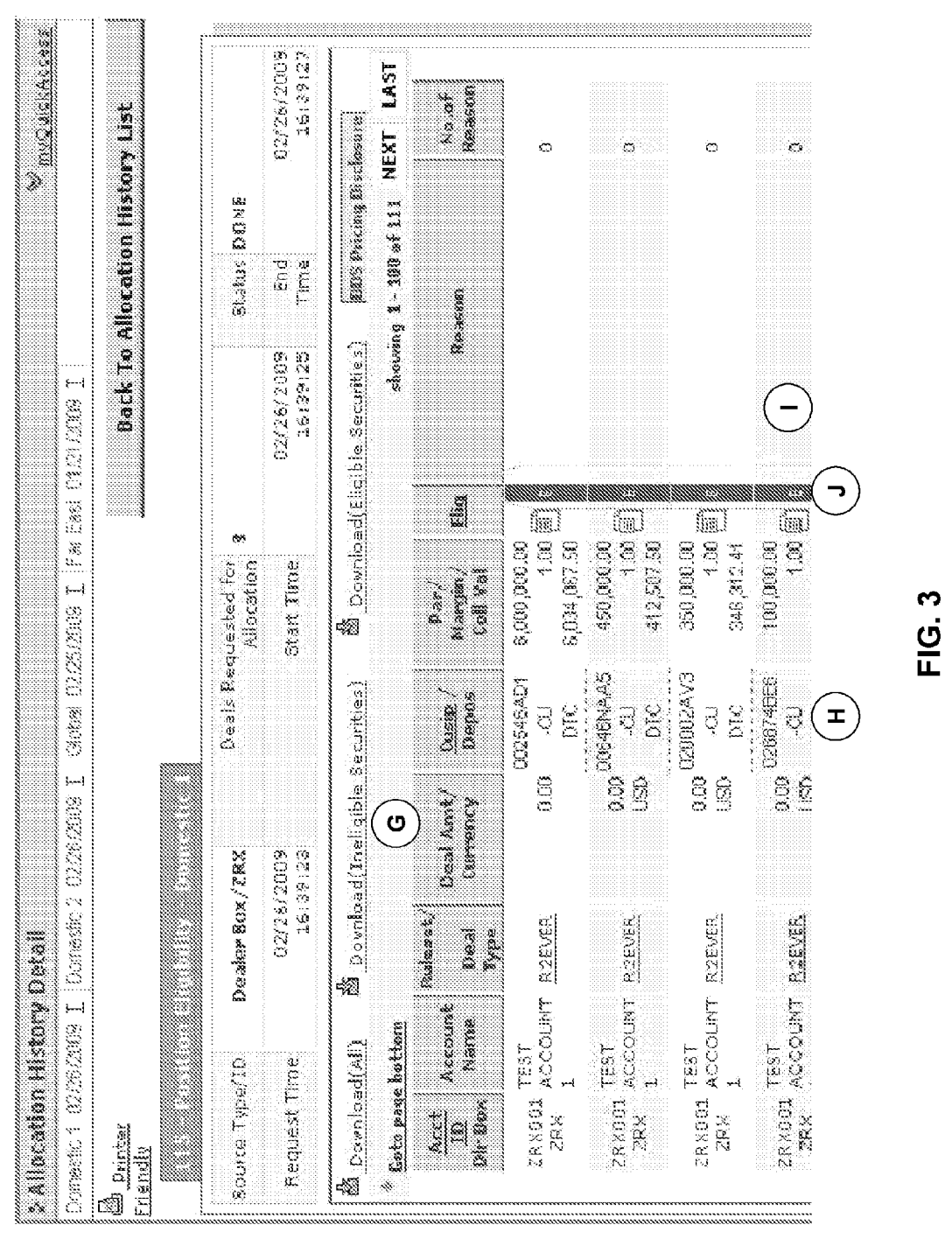

FIG. 3 provides an illustrative screen shot representing a Allocation History Detail Screen that may be used in a graphical user interface of an embodiment of this disclosure; and FIGS. 4A-4C illustrate a logic flowchart that implements a position eligibility algorithm and other rules relating to collateral eligibility determination in an embodiment of this disclosure.

DETAILED DESCRIPTION

In the discussion of various embodiments and aspects of the system and method of this disclosure, examples of a processor may include any one or more of, for instance, a personal computer, portable computer, personal digital assistant (PDA), workstation, or other processor-driven device, and examples of network may include, for example, a private network, the Internet, or other known network types, including both wired and wireless networks.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

The Appendix to this disclosure, described herein, provides an exemplary algorithm which may be implemented through computer software running in a processor to determine the "position eligibility" of various "security positions", i.e., ownership of a particular security or financial instrument. Of course, this algorithm is not intended to be limiting, but merely to describe one way of accomplishing the functions associated with determining collateral position eligibility.

In the discussion of various embodiments and aspects of the system and method of this disclosure, examples of trading parties include, but are not limited to, broker-dealers, institutional investors, and hedge fund managers.

In various embodiments, a web-based collateral management system or platform links dealers with investors to conduct collateral transactions in a safe, efficient, and reliable way. Online dealers and investors can manage collateral among a diverse range of instruments, including tri-party repo agreements in all major currencies, securities lending transactions, municipal deposits, bank loans, derivatives transactions, letters of credit, and structured trades, for example.

The system and method of this disclosure provide control and complete transparency of how collateral is managed, along with providing comprehensive screening and selection capabilities to enable precise transactions with the right collateral at the right time. Further, the system and method of this disclosure enables dealers to obtain attractive financing and helps investors make more informed decisions regarding collateral optimization so as to reduce the risk of over or under collateralization.

Acting as an agent of both parties to the trade, the custodian/manager of the system and method of this disclosure can provide daily mark-to-market valuations, haircuts/margins, and concentration limits (i.e., maintain percentages of market capitalization, dollar amount limits for a particular security, or a percentage of the portfolio in a particular security, for example), as well as manage, track, and settle collateral transactions across global capital markets by working collaboratively with clients to provide collateral transparency. The "position eligibility" functionality of embodiments of this disclosure allows broker dealers to pre-screen securities online, and to assess whether the securities can be used as collateral in tri-party financing or stock lending transactions. Other functions of the position eligibility function include the ability to search accounts based on different criteria, and include securities that are either held or not held in custody by the platform/system manager, e.g., The Bank of New York Mellon. Analytical results can be downloaded into standard spreadsheet software for further analysis.

Turning now to the drawing figures, the embodiment of FIG. 1 illustrates a functional block diagram of trading system 100 in which party 110 and party 111 access collateral management system 140 via network 130 and platform manager 120, or optionally bypasses platform manager 120. Collateral management system 140 may include network communication module 141 configured to process external communications between collateral management system 140 and network 130. Collateral eligibility module 142, described below, is configured using one or more processors (not shown) to evaluate various security positions in terms of their suitability as collateral for a particular financial trade or transaction. Payment processing module 143, indicated in dashed lines, represents optional functionality associated with business payment activities for services rendered by the system manager in processing and evaluating collateral for a financial trade. Internal account search module 144 may be configured to search one or more databases associated with client assets held in custody for, or for the benefit of various existing clients of platform manager 120. Internal account search module 144 may be configured to search for a particular type of security or asset, a particular security issuer, or a security rating, for example. Similarly, external account search module 146 may be configured to search various parameters associated with accounts that are not held in custody or for the benefit of existing clients of platform manager 120. Reporting and messaging module 145 may be configured to provide standard and/or custom report and messaging formats that may be transferred to network 130 by collateral management system 140, (optionally) through platform manager 120, or through an alternate communications path illustrated by the dashed double-ended arrow in FIG. 1. Memory storage device(s) 147, may include one or more databases 148 therein. Memory storage device 147 may be any type of conventional storage mechanism for example, random access memory (RAM), and database 148 may be any type of appropriate database, as would be known by a person of ordinary skill in the art, for example. Operator input/output and display module 149 represents various techniques and computer peripheral devices for providing operator input and output to collateral management system 140.

The system and method of this disclosure may be implemented in various ways, including a graphical-user-interface (GUI) as represented, at least in part, by FIG. 2, which illustrates one possible implementation of a "screenshot" that represents initial "Position Eligibility Screening". The circled letters in FIGS. 2 and 3 will now be addressed in turn.

Letter "A" in the window of FIG. 2 provides an input entry area to identify accounts to be searched by dealer ID, account, subdivide group, or by purchaser ID. Letter "B" provides an input area via the GUI to identify a source account that contains the securities positions, i.e., securities contemplated for use as collateral that are held in custody by a custodian or platform manager associated with collateral management system 140, and which should be checked for collateral eligibility. Letter "C" denotes an area in which securities to be checked for eligibility may be entered, with the option to add additional securities that are not held in custody by the custodian or platform manager associated with collateral management system 140, and for which collateral position eligibility is desired to be checked. Letter "D" denotes a "radio button" used to commence a search, which displays the selected account groups in result window "E", which displays a list of accounts and the available collateral in each account. From the list at Letter "E", an analyst or trader using the system can select specific accounts to be checked for position eligibility. After specifying the accounts to be checked for position eligibility, selecting the "check eligibility" (the soft button at Letter "F"), an eligibility check is run against the selected account groups.

Once the eligibility check has started, it takes into account all rules agreed for each account, and then compares the securities against these rules. Results of the check is stored intra-day in the user's allocation history, allowing a user to go back and look at the results of previous eligibility checks. These results can then be downloaded into a spreadsheet file or provided directly to the dealer for further analysis via a File Transfer Protocol (FTP), for example. User-defined rulesets may be input through Operator I/O and Display 149, for example.

Examples of entities and concentration types that may be used in developing various rules for evaluating securities for their eligibility as collateral are provided in Tables I and II, respectively.

TABLE I

ENTITIES

| Entity ID | Entity Description | Value |
|---|---|---|
| 0 | Broad Type | This is a 4 character field. This field represents a grouping of Security Sub-Groups (entity #20 below). An example is EQTY (Equity) and VTBL (Convertible) |
| 1 | Issuer | This is a 4 or 6 character field representing the BNY issuer id. An example is 000119 (Currently this is Nike, Inc.) |
| 2 | Country of Origin | 3 letter ISO Country code representing the domicile country of origin of the Issuer. An example is USA (United States) |
| 3 | Security Type | 4 byte BNY specific security type. An example is BOND (U.S. Treasury Bond). |
| 4 | Position Currency | 3 letter ISO Currency Code. An example is USD (United States Dollar) |
| 5 | Perpetual | Is the security perpetual? YES or NO |
| 6 | Security ID | The first two characters refer to the type of identifier (CU for Cusip, IS for Isin, CC for Common Code, SE for Sedol). A colon follows this. The security identifier follows this. |
| 7 | Depository | This is the BNY code for the depository. An example is ECLR for Euroclear. |
| 8 | Tags | This is a BNY tag. Tags can be used to specify indices or any other useful information about a security. |
| 9 | Security Rating | This represents the rating of the security by S & P, Moodys, or Fitch, along with the rating source. Please refer to the ratings scale table 2.4 and the rating operators in table 2.2. Note that this entity will have a compound value in the 04 record as noted above. |
| 10 | Issuer Rating | This represents the rating of the Issuer by either S & P or Moodys, along with the rating sources. Please refer to the ratings scale table 2.4 and the rating operators in table 2.2. Note that this entity will have a compound value in the 04 record as noted above. |
| 11 | Months To Maturity | This represents the months to maturity of the security. |
| 12 | Priority | This does not determine the eligibility of a security. It only determines the sort order of the positions during allocation time. The lower the number, the sooner it will be allocated. |
| 13 | Number of Rating Sources | This specifies the number of rating sources that should be present for each eligible position, along with the rating sources. Currently, there are three sources (S & P, Moodys, and Fitch). The number will range between 0 and three. Note that this entity will have a compound value in the 04 record as noted above. |
| 14 | Weighted Average Maturity (WAM) | This is used to specify a weighted average of the months to maturity at the account level. If a position can't be allocated because it would break the WAM, then it is put aside and retested at a later phase in the allocation. This rule will always be "ANDed" with every other rule in the ruleset. |
| 16 | Weighted Average Credit | This is used to specify a weighted average of the Security Rating at the account level. Ratings are translated into numbers using the ratings scale table 2.4. If a position can't be |

TABLE I-continued

ENTITIES

| Entity ID | Entity Description | Value |
|---|---|---|
| | Rating (WACR) | allocated because it would break the WACR, then it is put aside and retested at a later phase in the allocation. This rule will always be "ANDed" with every other rule in the ruleset. |
| 18 | Issuer Group | This is a BNY Issuer group. This represents a grouping of issuers (entity #1). Currently, there are no Issuer groups on the system to give you an example. |
| 19 | Security Price | This is the price of one par of the security. |
| 20 | Security Sub-Group | This is a BNY grouping of the sec types (entity #3). |
| 21 | Deal Currency | This is the currency of the deal (not of the position). |
| 22 | Deal Type | This is the type of the deal. R—Rollover, T—Term, O—Overnight |
| 25 | Coupon Rate | This is the coupon rate of a security. |
| 26 | Market Capitalization | This is the market capitalization expressed in USD |
| 36 | Dealer Box | This represents the source dealer box of the collateral. |
| 37 | Calendar Days to Maturity | The time to maturity for a security, expressed in calendar days. This provides a finer-grained range than the Months to Maturity entity. |
| 39 | Record Date | Indicates whether or not the security should be used on the record date of the dividend payment. This will be either 1 (Include) or 0 (Exclude). |
| 40 | Security Price in USD | This is the price of one par of the security expressed in USD. This is in contrast to the Security Price entity that expresses the price of one par in the issuing currency. |
| 41 | Market Capitalization | This is the number of outstanding shares times the Security Price in USD. |
| 42 | GICS Sector Code | The GICS Sector Code for the security. |
| 43 | GICS Sub-Industry Code | The GICS Sub-Industry Code for the security. |

TABLE II

CONCENTRATION TYPES
TABLE II—CONCENTRATION TYPES

| Concentration Type | Description |
|---|---|
| **% | The concentration limit is a percentage of the portfolio. The concentration limit must be between (but not including) 0 and 100. |
| **P | The concentration limit is a Par value. |
| *M1 | The concentration limit is Y times yesterdays traded volume where Y is the specified concentration limit. |
| *M2 | The concentration limit is Y times the 2-day average traded volume where Y is the specified concentration limit. |
| *M3 | The concentration limit is Y times the 3-day average traded volume where Y is the specified concentration limit. |
| *M4 | The concentration limit is Y times the 4-day average traded volume where Y is the specified concentration limit. |
| *M5 | The concentration limit is Y times the 5-day average traded volume where Y is the specified concentration limit. |
| *M3 | The concentration limit is Y times the 30-day average traded volume where Y is the specified concentration limit. |
| *M6 | The concentration limit is Y times the 60-day average traded volume where Y is the specified concentration limit. |
| *M9 | The concentration limit is Y times the 90-day average traded volume where Y is the specified concentration limit. |
| *MC | The concentration limit is Y percent of the Market Cap where Y is the specified concentration limit (a number between 0 and 100). |

The Rest of the concentration limits represent Currency Concentration Limits for various currencies. The concentration limit specified must be in the currency specified and will be the maximum cash value of the position that can be allocated.

Eligibility results are based on data which may be provisional and/or unvalidated. It is recommended that the user performs appropriate validation checks prior to executing trades based on these results. Alternately, it is the user/client's responsibility to ensure that sufficient collateral is held by the custodian/manager of collateral management system 140 to cover any obligations, whether based on financial projections or otherwise.

Turning now FIG. 3, a screenshot of an allocation history detail screen is similarly annotated as in FIG. 2. Letter "G" provides a soft button to download results (e.g., in CSV format) representing the full set of data, or a subset of the data as either Eligible or Ineligible positions are returned. Letter "H" shows an area on the screen where specific security information may be displayed, such as margin and collateral value for one or more securities. Letter "I" indicates an area on the screen, where, once completed, the reason(s) why a position is ineligible is presented to the user if the position is ineligible, or is missing the necessary data to make a determination. Reference letter "J" in FIG. 3 shows an indication of eligible collateral by use of the eligibility flag (the letter "E") in the graphical user interface. Alternatively, a security ineligible for use as collateral would have an "I" indication in the column denoted by "J", with a reason for ineligibility provided in the space indicated by the letter "I". Reasons for ineligibility may include the reasons indicated in TABLE III, below.

TABLE III

INELIGIBILITY REASONS

| Reason Text | Description |
|---|---|
| Path Number: # | If more than one path is being reported on, the path number is printed along with all failed rules |

TABLE III-continued

INELIGIBILITY REASONS

| Reason Text | Description |
| --- | --- |
| | on that path. If there is a problem with security data that is making that position ineligible, the problem only needs to be corrected on one path to make that position eligible. |
| ENTITY OPERATOR VALUE(S); Position Value: VALUE(S) | For each failed rule being reported, the entity, operator, and value(s) of that rule is display, along with the supporting data from the security position to show why the rule failed. As an example: Months to Maturity <= 12; Position Data: 15 In this example, the rule specifies that the months to maturity must be <= 12, but the security position has a months to maturity of 15 making this rule fail. |
| No Broad Type or Sec Subgrp Found for Sec Type | The security position has a security type not configured on the system. |
| Sec Type SECURITY_TYPE not eligible. | The security position has a security type not eligible per the specified ruleset. |
| Concentration Limit: No # Day Average Traded Volume received from our regular vendors | The # Day Average Traded Volume is required to calculate eligibility based on a concentration limit, but we do not have this data available to calculate eligibility at this time. # can be one of 1, 2, 3, 4, 5, 30, 60 or 90. |
| Concentration Limit: No Market Cap or Shares Outstanding received from our regular vendors | The Market Cap or Shares Outstanding is required to calculate a concentration limit, but we do not have this data available to calculate eligibility at this time. |
| Margin Error: Incremental margin changed margin to haircut. | An incremental margin in the ruleset changed a margin to a haircut. This is usually due to a ruleset setup problem. |
| Margin Error: Incremental margin changed haircut to margin. | An incremental margin in the ruleset changed a haircut to a margin. This is usually due to a ruleset setup problem. |
| Margin Error: Full margin not found. | A margin or haircut cannot be found in ruleset. |
| Par (#) < Min Par (#) | The available par value is smaller than the minimum required par value. |
| Par (#) < Mult Par (#) | The available par value is smaller than the multiple par value required to allocate. |
| No price received from our regular vendors | This occurs when the market value is zero. This can be caused by a zero value in price, price factor or exchange rate. |
| Security Information Missing. | Security is not known to BNY Mellon at this time. |

FIGS. 4A, 4B, and 4C represent a logic flow diagram of a method/process of an embodiment of this disclosure. In FIG. 4A, the process starts at step S410, and continues to step S415, where various rulesets may be read from database 148. As discussed in more detail in the accompanying APPENDIX to this disclosure, rulesets are Boolean expressions that apply logical "AND" and "OR" operators to a set of rules to form a complex expression, which results in either a "TRUE" (eligible) or "FALSE" (ineligible) response. By way of non-limiting example, a ruleset could include a "broad" type of rule in which a type of security may be specified, for example by specifying all types of equities (e.g., stock), or debt (e.g., convertible bonds and/or preferred equities), or commodities such as foreign currency or precious metals. See Rules 1 and 4 in the APPENDIX. As a further rule, the user may further specify the type of security issuer rating to be considered, e.g., "BB" or "Ba2", or a security rating, e.g., "A-", "AA", "Aa2", etc. See Rules 2, 3, and 5 in the APPENDIX. A listing of entities and concentration limits may be found in TABLES I and II, above.

Using known Boolean algebra manipulation techniques at steps S420, S425, and S430, the resulting logical equations/operations can be iteratively expanded into a standard form in which "OR" operators "bubble up" to the top of the binary decision tree, and from which individual "trees" defining a path are formed at step S435. The definition of a "path" is that every rule on the path must be eligible in order for a security position to be eligible on that path.

At step S440, the collateral eligibility module 142 tracks and records various attributes, e.g., the number of "PASS" and "FAIL" rules for each path. In addition, collateral eligibility module 142 may track whether a generic position matching the same security type and position currency could be eligible on that path, or whether a generic position matching the same security type could be else go on that path. Step S445 tests the eligibility of the security position on each path and, if the position is eligible on every rule in a path at step S450, a "POSITION ELIGIBLE" determination is made at step S455, and the process continues to interim node "A" at step S460, which continues on FIG. 4B. if the determination is made at step S450 that the position is not eligible on every rule in the path, the process continues to interim node "B" at step S465, and which continues on FIG. 4C.

If a rule is in the "FAIL" state and mentions a broad type of security, a security subgroup, or a security type entity, the path the rule is on is considered not to accept positions of that security type. Likewise, if a rule in the "FAIL" state mentions the position currency, then the path the rule is on is considered not to accept positions with the same position currency. Such currency positions may not be acceptable due to perceived or actual weakness or risk involved with a currency of a particular type.

Turning now to FIG. 4B, at step S460, the security position has been found to be eligible on every rule in a given path, and the algorithmic "binary tree" processing ends. However, outside of the ruleset, there are other user-definable reasons why a security position might not be eligible or desirable as collateral for a trade. Exemplary checks begin at step S470 and continue on through step S495.

For example, if the market value of the security position is zero, this security would not be eligible for collateralization, and a zero price warning would be reported/output at step S475. As another example, if a minimum number of shares that can be held in a security position ("par") is less than a minimum par value at step S480, a warning/report is provided at step S485. If the par value related to the security position is greater than the minimum par value, but less than a required multiple par value, at step S490, an evaluation is made, and an appropriate report/warning is made at step S495.

At step S500, all eligible or reported paths are iteratively checked to confirm that each path has at least one full margin. A full margin is a price premium used in connection with various securities having different liquidities and relative risk. If a full margin is not provided, a warning is reported at step S510 that no margin has been found. Incremental margins may also be used.

At step S515, all eligible or reported paths are iteratively checked and, if any rule contains a concentration limit, collateral eligibility module 142 will confirm that sufficient data exists at step S525 to calculate the concentration limit. If the eligible path rules do not contain a concentration limit, then processing stops at step S520. If sufficient data to calculate a concentration limit does not exist, then a missing data report is generated at step S530, and the processing ends at step S520. If sufficient data to calculate a concentration limit is found at step S525, then a report that market concentration data exists is provided at step S535.

In FIG. 4C, at step S465, the security position has been found ineligible based upon the binary logic tree processing algorithm. However, at step S540, the set of path(s) where a generic position matching the security type and position currency is reviewed. The path(s) with the highest "PASS/FAIL" ratio is used for reporting purposes at step S545. All rules in a FAIL state on these paths are reported at step S550 as reasons why the security position is not eligible for collateralization. Processing at step S555 proceeds to step S460 (letter "A") in FIG. 4B. If, at step S540 there are no paths where generic position matching of both security type and position currency is found, then paths with generic position matching of only the security type is reviewed at step S560. Again, path(s) with the highest "PASS/FAIL" ratio is used for reporting purposes at step S545, and all rules in a FAIL state on these paths are reported at step S550 as reasons why the security position is not eligible for collateralization.

If steps S540 and S560 do not find any reasons for collateral ineligibility, then step S565 assumes that the reason for ineligibility is that the security type of the security position is not eligible in the given ruleset. Processing at step S555 proceeds to step S460 (letter "A") in FIG. 4B.

In addition, the system and method of this disclosure may be utilized in a "pre-deal" scenario, i.e., after agreement between the parties but before the deal becomes active. Further, the system and method of this disclosure may be utilized in a "post-deal" scenario, i.e., after agreement between the parties and after the deal becomes active.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

APPENDIX

Algorithm

Step 1) Read the ruleset from the database. The ruleset is a Boolean expression that applies the AND and OR operators to a set of rules to form a complex expression the results in a TRUE (eligible) or FALSE (ineligible) response. The Boolean expression has the following context-free grammar:

| expression | := | term exprRest |
|---|---|---|
| exprRest | := | '+' term exprRest |
| | | \| /* EMPTY */ |
| term | := | factor termRest |
| termRest | := | '*' factor termRest |
| | | \| /* EMPTY */ |
| factor | := | '(' expression ')' |
| | | \| rule |

As an example, assume we have the following ruleset:

| Broad Type = EQUITY ALL SUB TYPES | Rule1 |
|---|---|
| Issuer Rating (MAX) >= BB/Ba2 | Rule2 |
| Security Rating (MAX) >= A- / A3 / A- | Rule3 |
| Broad Type = CONV BOND + PREF EQTY | Rule4 |
| Security Rating (MAX) >= AA / Aa2 / AA | Rule5 |

The Boolean expression representing this ruleset is:

((Rule1 AND (Rule2 OR Rule3)) OR (Rule4 AND Rule5))

Step 2) Using an LL Parser and the above mentioned context-free grammar, the ruleset is parsed into a binary tree. All of the rules become leaf nodes on the binary tree and the operators become the non-leaf nodes of the binary tree. The binary tree for the above example would look like:

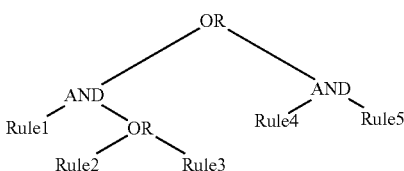

An LL parser is a top-down parser for a subset of the context-free grammars. It parses the input from Left to right, and constructs a Leftmost derivation of the sentence (hence LL, compared with LR parser).

Step 3) Iterating in an infinite loop, apply the following two expansion formulas (following the rules of mathematics if we pretend that AND is multiplication and OR is addition). Each iteration executes a single expansion. We keep repeating the expansion until we can no longer expand the expression. This causes the OR operators to "bubble up" to the top of the tree.

"R1 AND (R2 OR R3)" expands to "(R1 AND R2) OR (R1 AND R3)"  Expansion Formula 1:

"(R1 OR R2) AND (R3 OR R4)" expands to "(R1 AND R3) OR (R1 AND R4) OR (R2 AND R3) OR (R2 AND R4)"  Expansion Formula 2:

The new expanded expression has the same boolean value as the original expression.

The OR operators (if any exist) are at the top most part of the tree. The rules still form the leaf nodes of the tree. Any AND operators that exist would be located between the OR operators and the rules, or would be located at the top portion of the tree if there are no OR operators in the ruleset.

The sample tree will now look like below.

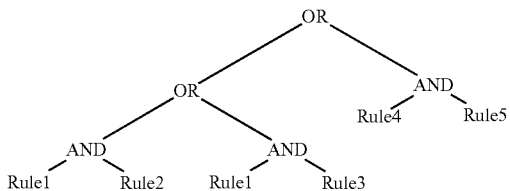

Step 4) The OR operators are now chopped off to form individual trees. Each new tree is considered a path. The definition of a path is that every rule on the path must be eligible in order for a position to be eligible on that path.

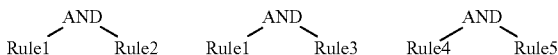

In this example, we form 3 paths.
Path 1: Rule1, Rule2
Path 2: Rule1, Rule3
Path 3: Rule4, Rule5

Step 5) Next we go through the process of testing eligibility of the position on each path. As we go through the testing process, we keep track of the following attributes:
 a) Number of PASS and FAIL rules for each path.
 b) Whether a generic position matching the same security type and position currency could be eligible on that path.
 c) Whether a generic position matching the same security type could be eligible on that path.
Note: If a rule is in the FAIL state and mentions the broad type, sec subgrp, or sec type entities, the path is considered not to accept positions of that sec type. Likewise, if a rule in the FAIL state mentions the position currency, then the path is considered not to accept positions with the same position currency.

Step 6) If the position is found eligible on every rule in a given path, then the position is eligible and processing ends. Skip to Step 10.

Step 7) If the position is found not eligible, the set of paths where a generic position matching the sec type and pos currency is reviewed. The path(s) with the highest pass/fail ratio is used for reporting purposes. All rules in a FAIL state on these paths are reported as reasons why the position is not eligible.

Step 8) If the position is found not eligible, and there are no paths where a generic position matching both sec type and pos currency is found, then paths where generic position matching only sec type is reviewed. The path(s) with the highest pass/fail ratio is used for reporting purposes. All rules in a FAIL state on these paths are reported as reasons why the position is not eligible.

Step 9) If steps 7 and 8 don't find any reasons, then the reason is assumed to be that the sec type is not eligible in the given ruleset.

Step 10) Outside of the ruleset, there are a few other reasons why a position might not be eligible. These checks are done now.
 a) If the market value is zero, report a zero price warning.
 b) If the par <min_par, report par <min_par warning.
 c) If the par >min_par, and par <mult_par, report par <mult_par warning.

Step 11) Iterate through all eligible or reported paths and confirm that each path has at least 1 full margin. If not, report a warning that margin was not found.

Step 12) Iterate through all eligible or reported paths and if any rule contains a concentration limit, confirm that sufficient data exists to calculate the concentration limit. If not, report a warning that the underlying data is missing (ie. Market Cap, Market Volume). If there is a concentration limit, then report that a concentration limit exists (regardless of whether the position is eligible or not).

What is claimed is:
1. A data processing system for managing collateral risk associated with a trade of a financial instrument, the system comprising:
 a processor;
 a memory coupled to the processor and containing a database therein configured to store a ruleset relating to determining eligibility of collateral to be considered for a desired trade;
 a search module configured to search for accounts that could potentially accept a security position therein based upon established search criteria and to store search results obtained therefrom in said memory, said search module using the search results to identify one or more security positions eligible for use as collateral for the trade; and
 a collateral analysis module that determines a collateral preference ranking of the one or more security positions eligible for use as collateral for the trade by at least applying said ruleset via an algorithm executed by said processor so as to confirm an eligibility of said one or more security positions eligible for use as collateral for the trade by testing in accordance with the ruleset,
 wherein the processor outputs a relative collateral preference indication via a user interface.

2. The system of claim 1, wherein the user interface is configured to allow a user thereof to selectively run a collateral eligibility check on selected accounts.

3. The system of claim 2, wherein the collateral eligibility check comprises outputting an indication of missing or incomplete information such that a determination of collateral eligibility is not possible for one or more of the selected accounts.

4. The system of claim 1, wherein the ruleset is configured for a particular account type.

5. The system of claim 1, further comprising a plurality of rulesets, each of the plurality of rulesets being associated with a particular account.

6. The system of claim 5, wherein the collateral analysis module determines a collateral preference ranking for each of the particular accounts by applying each of said plurality of rulesets via algorithms executed by said processor so as to provide a collateral eligibility check for each of said particular accounts by testing in accordance with an associated ruleset of the plurality of rulesets.

7. The system of claim 6, wherein the collateral eligibility check for each of said particular accounts is stored in said memory as a downloadable spreadsheet.

8. The system of claim 6, wherein the collateral eligibility check for each of said particular accounts is stored in said memory and displayed on a display.

9. The system of claim 8, wherein the display at least displays a collateral value and a margin requirement for each collateral-eligible security.

10. A computer-implemented method for managing collateral risk associated with a trade of a financial instrument, the method comprising:
providing a data processing system comprising a memory coupled to a processor and containing a database therein configured to at least store one or more user-definable rulesets relating to a desired trade;
searching for accounts that could accept potentially eligible security positions therein based upon user-selectable search criteria and storing search results obtained therefrom in said memory and using the search results to identify each of the potentially eligible security positions for consideration as collateral for the trade; and
determining an eligibility of the potentially eligible security positions as collateral for the trade by applying said one or more user-definable rulesets in an algorithm executed by the processor by testing an eligibility of said each of the potentially eligible security positions as collateral for the trade, said testing an eligibility comprising testing an eligibility along each of a plurality of logical paths defined by the one or more user-definable rulesets; and
causing the processor to output a relative collateral preference indication via a user interface.

11. The method of claim 10, further comprising storing the relative collateral preference indication in said memory as a downloadable spreadsheet.

12. The method of claim 10, further comprising storing the relative collateral preference indication in said memory and displaying the relative collateral preference indication on a display.

13. The method of claim 10, further comprising allowing a user to selectively run a collateral eligibility check on selected accounts via the user interface.

14. The method of claim 10, further comprising outputting an indication of missing or incomplete information such that a determination of collateral eligibility is not possible for one or more user-selected accounts.

15. The method of claim 10, further comprising displaying at least a collateral value and a margin requirement for each collateral-eligible security.

16. An article of manufacture comprising a tangible computer-readable medium that contains computer-executable code thereon which, when executed by a processor, causes the processor to carry out functions that manage collateral risk associated with a trade of a financial instrument, wherein the executed code is operable to:
store at least one or more user-definable rulesets relating to a desired trade in a memory;
search for accounts that could accept potentially eligible security positions therein based upon user-selectable search criteria and store search results obtained therefrom in said memory, said at least one search module using the search results to identify each of the potentially eligible security positions for consideration as collateral for the trade; and
determining an eligibility of the potentially eligible security positions as collateral for the trade by applying said one or more user-definable rulesets in an algorithm executed by the processor by testing an eligibility of said each of the potentially eligible security positions as collateral for the trade, said testing an eligibility comprising testing an eligibility along each of a plurality of logical paths defined by the one or more user-definable rulesets; and
causing the processor to output a relative collateral preference indication via a user interface.

17. The article of manufacture of claim 16, wherein the executed code is further operable to provide a web portal through which the user interface accesses the processor.

* * * * *